(12) United States Patent
Leong (10) Patent No.: US 11,502,848 B2
(45) Date of Patent: Nov. 15, 2022

(54) BLOCKCHAIN ENTITY, OFF-CHAIN ENTITY, CERTIFICATION DEVICE FOR BLOCKCHAIN OPERATIONS AND METHOD FOR PERFORMING A COOPERATION BETWEEN A BLOCKCHAIN ENTITY AND AN OFF-CHAIN ENTITY

(71) Applicant: INFINEON TECHNOLOGIES AG, Neubiberg (DE)

(72) Inventor: Wen Xin Leong, Singapore (SG)

(73) Assignee: INFINEON TECHNOLOGIES AG, Neubiberg (DE)

( * ) Notice: Subject to any disclaimer, the term of this patent is extended or adjusted under 35 U.S.C. 154(b) by 299 days.

(21) Appl. No.: 16/574,140

(22) Filed: Sep. 18, 2019

(65) Prior Publication Data
US 2020/0092106 A1 Mar. 19, 2020

(30) Foreign Application Priority Data
Sep. 19, 2018 (DE) .......................... 10 2018 122 997

(51) Int. Cl.
*H04L 9/32* (2006.01)
*H04L 9/06* (2006.01)
*H04L 9/00* (2022.01)

(52) U.S. Cl.
CPC .......... *H04L 9/3247* (2013.01); *H04L 9/0637* (2013.01); *H04L 9/3213* (2013.01); *H04L 9/50* (2022.05)

(58) Field of Classification Search
CPC .............. H04L 2209/38; H04L 9/0637; H04L 9/3213; H04L 9/3247; H04L 9/3239; H04L 9/3268
See application file for complete search history.

(56) References Cited

U.S. PATENT DOCUMENTS

| | | | |
|---|---|---|---|
| 10,250,395 B1 * | 4/2019 | Borne-Pons | H04L 63/12 |
| 2017/0149819 A1 | 5/2017 | Androulaki et al. | |
| 2018/0302222 A1 * | 10/2018 | Agrawal | H04L 9/3213 |
| 2019/0372993 A1 * | 12/2019 | Dunjic | H04L 9/3268 |

OTHER PUBLICATIONS

Buterin V; "A Next Generation Smart Contract & Decentralized Application Platform" Ethereum White Paper; https://github.com/ethereum/wiki/wiki/White-Paper; retrieved on Sep. 25, 2019; 36 pages.
Brainbot Labs Est. ("BBLE"); "The Raiden Network"; https://raiden.network/; Sep. 5, 2018; 10 pages.
Poon, J. et al.; "The Bitcoin Lightning Network: Scalable Off-Chain Instant Payments"; dated Jan. 14, 2016; 59 pages.
(Continued)

*Primary Examiner* — Olugbenga O Idowu
(74) *Attorney, Agent, or Firm* — Viering, Jentschura & Partner MBB (57) ABSTRACT

According to various aspects, a blockchain entity is described herein to include a receiver configured to receive a digital signature of a certification entity for a cooperation between the blockchain entity and an off-chain device, a validity checker configured to check whether the digital signature for the cooperation is valid, and a controller configured to perform the cooperation with the off-chain device if the digital signature for the cooperation is valid.

21 Claims, 8 Drawing Sheets

(56) References Cited

OTHER PUBLICATIONS

Dewan M.; "An Idiots Guide to Public Key Infrastructure"; dated Sep. 27, 2002, 15 pages, Version 1.4b.
Swoboda, J et al.; "Kryptographie und IT Sicherheit"; 2008, 20 pages including 12 pages of english translation, 1st Edition.
Wikipedia; "Bitcoin"; https://de.wikipedia.org/w/index.php?title=Bitcoin&oldid=180841545; Sep. 12, 2018, 97 pages including 49 pages of english translation.
German search report issued for corresponding German patent application DE10 2018 122 997.6 dated Jun. 7, 2019, 8 pages (for informational purpose only).

* cited by examiner

FIG 7 ions according to an aspect of the present disclosure.

BLOCKCHAIN ENTITY, OFF-CHAIN ENTITY, CERTIFICATION DEVICE FOR BLOCKCHAIN OPERATIONS AND METHOD FOR PERFORMING A COOPERATION BETWEEN A BLOCKCHAIN ENTITY AND AN OFF-CHAIN ENTITY

CROSS-REFERENCE TO RELATED APPLICATION

This patent application claims priority to German Patent Application Serial No. 10 2018 122 997.6, which was filed on Sep. 19, 2018, and is incorporated herein by reference in its entirety and for all purposes.

TECHNICAL FIELD

The present disclosure relates to blockchain entities, off-chain entities, certification devices for blockchain operations and methods for performing a cooperation between a blockchain entity and an off-chain entity.

BACKGROUND

Blockchain technology provides a secure protocol to achieve decentralization of a database. It allows transfer of authority from central control to the hand of users and includes physical data being distributed and stored among the users. It can also be described as a distributed ledger technology. Its most important feature can be seen in that the resulting database is tamper proof. A blockchain system may, in particular, support transactions between different entities, e.g. users. However, the use case may arise that a transaction is performed between blockchain entity and an entity, which is not part of the blockchain system, i.e. an off-chain entity. Efficient approaches for supporting such a use case are desirable.

SUMMARY

According to an aspect of the present disclosure, a blockchain entity is provided including a receiver configured to receive a digital signature of a certification entity (also referred to herein as a "certification authority") for a cooperation between the blockchain entity and an off-chain device, a validity checker configured to check whether the digital signature for the cooperation is valid and a controller configured to perform the cooperation with the off-chain device if the digital signature for the cooperation is valid.

According to a further aspect of the present disclosure, an off-chain entity for interaction with a blockchain network is provided including a receiver configured to receive a digital signature of a certification entity for a cooperation between a blockchain entity and the off-chain entity, a validity checker configured to check whether the digital signature for the cooperation is valid and a controller configured to perform the cooperation with the blockchain device if the digital signature for the cooperation is valid.

According to a further aspect of the present disclosure, a certification device for blockchain operations is provided including a signature generator configured to generate a digital signature for a cooperation between a blockchain entity and an off-chain entity and a transmitter configured to transmit the digital signature to the blockchain entity.

According to a further aspect of the present disclosure, a method for performing a cooperation between a blockchain entity and an off-chain entity is provided including a certification device providing a digital signature for a cooperation between the blockchain entity and the off-chain entity, checking whether the digital signature for the cooperation is valid and performing the cooperation between the blockchain entity and the off-chain entity if the digital signature for the cooperation is valid.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. In the following description, various aspects are described with reference to the following drawings, in which.

Also, details and features illustrated, singly or in combination, in connection with aspects of the present disclosure as exemplified in any one of the annexed figures are not limited to possible use in such aspects of the present disclosure and can be applied, singly or in combination, in aspects of the present disclosure as exemplified in any other of the annexed figures.

DETAILED DESCRIPTION

The following detailed description refers to the accompanying drawings that show, by way of illustration, specific details and aspects in which the present disclosure may be practiced. Other aspects may be utilized and structural, logical, and electrical changes may be made without departing from the scope of the present disclosure. The various aspects of the present disclosure are not necessarily mutually exclusive, as some aspects of the present disclosure can be combined with one or more other aspects of the present disclosure to form new aspects.

Blockchain technology is becoming more and more used for various applications. A blockchain can typically be seen as a distributed database that maintains a continuously growing list of records secured against tampering. A blockchain may include a number of blocks of interaction records wherein each block includes a timestamp and a link to a previous block. For example, each block may include or be appended to a hash of the preceding block. In other words, interaction records in a blockchain may be stored as a series of blocks that include a record of a number of transactions occurring over a given period of time. A new block may be appended to a blockchain by a blockchain provider after it completes the block and the block has been validated. A blockchain can, for example, be used to verify transactions. The security of a blockchain may be obtained using a cryptographic scheme.

Figure 1:
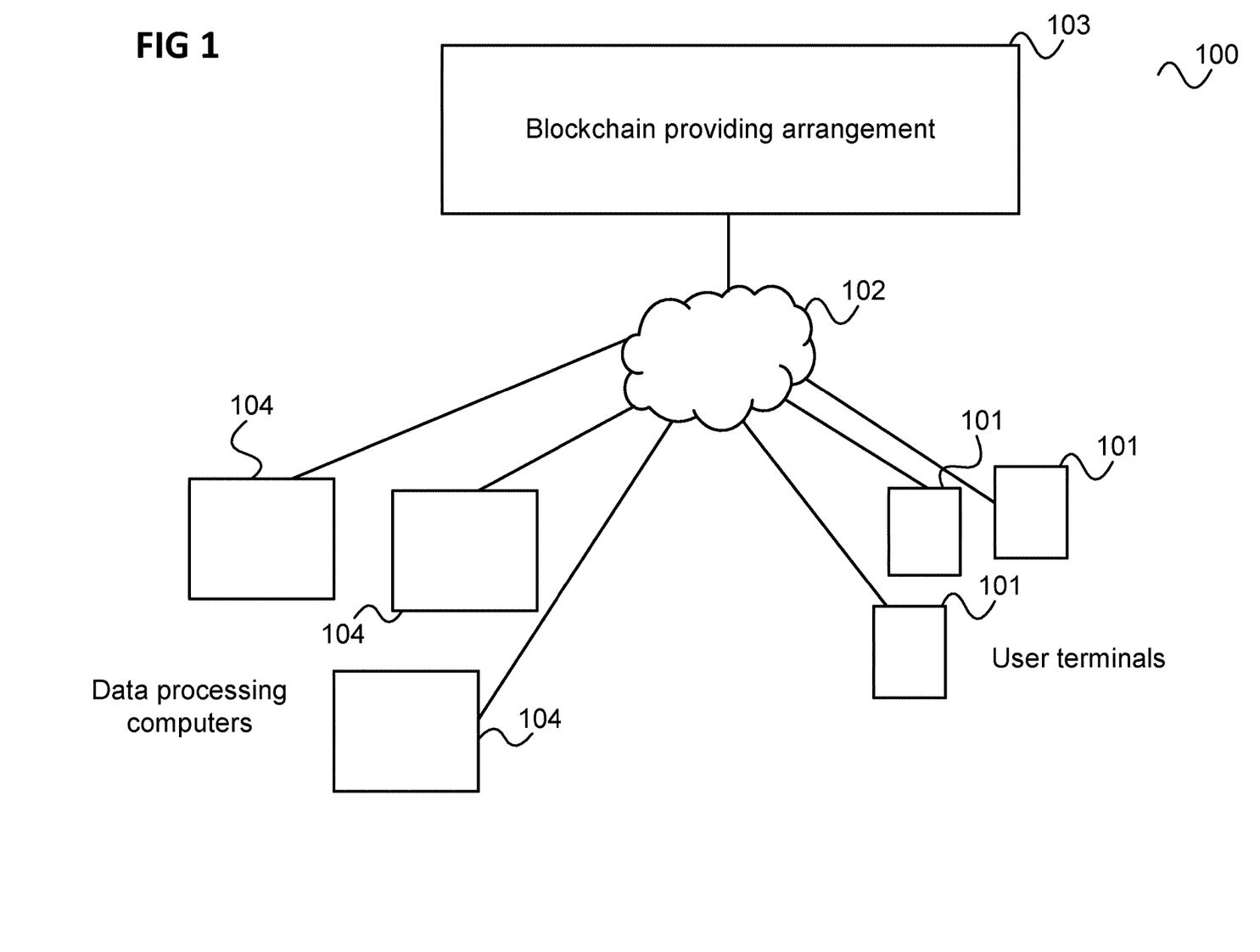
FIG. 1 shows a block diagram of a blockchain network, i.e. a computer network for managing and operating a blockchain.

FIG. 1 shows a block diagram of a blockchain network 100, i.e. a computer network for managing and operating a blockchain.

The network 100 may include one or more user devices 101 and a blockchain provider computer arrangement 103 and one or more data processing computers 104. Each of these devices and computers may be communicatively coupled with each other via a communication network 102 such as the Internet using a suitable communication protocol.

A blockchain provider, e.g. the blockchain provider computer arrangement 103, can include one or more electronic devices configured to provide blockchain functionality. The blockchain provider computer arrangement 103 can include a single device or multiple devices configured to maintain aspects of the blockchain. In some examples, the blockchain provider computer arrangement 103 may additionally provide token management functionality.

In the blockchain network 100, data transfer request messages may be exchanged. A data transfer request message may be understood as an electronic message utilized to request a data transfer. A data transfer request message may be initiated by a user device 101 (e.g., a user device operated by a user). A data transfer request message may also be initiated by a data processing computer 104. The data transfer request message may indicate a recipient of the data transfer. The data transfer request message may indicate a value associated with the data transfer, i.e. a transaction value. By way of example, the value may indicate a monetary amount, a digital asset amount, e.g. an amount of tokens, a number of points (e.g., reward points, a score, etc.), or any suitable value of transferable data. Alternatively, it may also indicate an instruction, e.g. for a smart home, for example an instruction to operate an actuator, e.g. to open a lock of a door. It is therefore also generally referred to as a request for a cooperation between two entities herein.

The data transfer request message may, in case it relates to a transaction for example, include data fields including, but not limited to, an initiator identifier data field, a recipient identifier data field, a transfer value data field specifying the transaction value, a digital signature data field, a transaction value, a timestamp data field, and the like. In some examples, the transaction value may be in a format suitable for immediate recordation within a ledger managed by the blockchain provider computer arrangement 103. In some aspects, a data transfer request message may be signed using a private key associated with the user or user device initiating the data transfer request message, such that it may be verified using a public key associated with the user or user device.

The blockchain provider computer arrangement 103 may include multiple blockchain provider computers wherein each one includes components for data processing, such as a processor and a computer readable medium coupled to the processor, the computer readable medium including code, executable by the processor for performing the functionality described herein. The blockchain provider computer arrangement 103 may be communicatively coupled to the data processing computers 104 and to the user devices 101, e.g. via communication network 102. A computing device may also act as blockchain provider computer 103 and as a user terminal 101 at the same time.

According to various aspects, the blockchain provider computer arrangement 103 may be configured to perform token management functions including the maintenance and/or enforcement of tokens. The blockchain provider computer arrangement 103 may be configured to receive token request messages from the data processing computers 104 and/or the user devices 101 and provide token response messages to the data processing computers 104 and/or the user devices 101. In some aspects, the blockchain provider computer arrangement 103 may be configured to provision and maintain a mapping of a token (e.g., an amount and/or threshold limit) and a user/entity for which the token is associated.

For the management of tokens (or other assets) the blockchain provider computer arrangement 103 may run a so-called smart contract. A smart contract is a piece of software that can be deployed and be executed on a blockchain network 100. The characteristic of a smart contract is similar to software that runs on a classic web server (capable of process/store data) except it is decentralized.

As stated above, a user device 101 may, at the same time, also be part of the blockchain provider computer arrangement 103. This means that a user device 101 may also take over tasks related to the provision of the blockchain as described above for the blockchain provider computer arrangement 103. Such user devices 101 and other computing devices being part of the blockchain provider computer arrangement 103 are also referred to as blockchain entities in the following. Alternatively, a user device 101 may be an off-chain entity (e.g., an off-chain device), which is not part of the blockchain provider computer arrangement 103. An off-chain entity (e.g., device) may, for example, be understood as an entity (e.g., computing device), which is not involved in tasks related to the provision of the blockchain, for example an entity which does not generate new blocks of the blockchain, e.g. does not verify transactions or calculate hashes of blocks, while an on-chain entity may be understood as an entity (e.g., device) which performs such tasks.

An off chain entity may, for example, be a device with any of the following:

No access, limited access or no direct access to the blockchain network;

Not capable of storing a blockchain;

Not able to obtain the latest version of the blockchain.

Therefore, the off-chain entity may be understood as a device, which is unable to reliably utilize blockchain to perform verification (e.g., check an amount of tokens, check an owner of tokens, etc.). In other words, the blockchain is unable to function properly in the off-chain entity.

According to one example, a smart card is an off-chain entity. However, a smart card typically cannot act alone, but requires another device such as a NFC (Near Field Communication) supporting telephone to act as an interface/communication translation layer (e.g., to read a signature from a smart contract via Internet, it sends the signature to the smart card via NFC).

Figure 2:
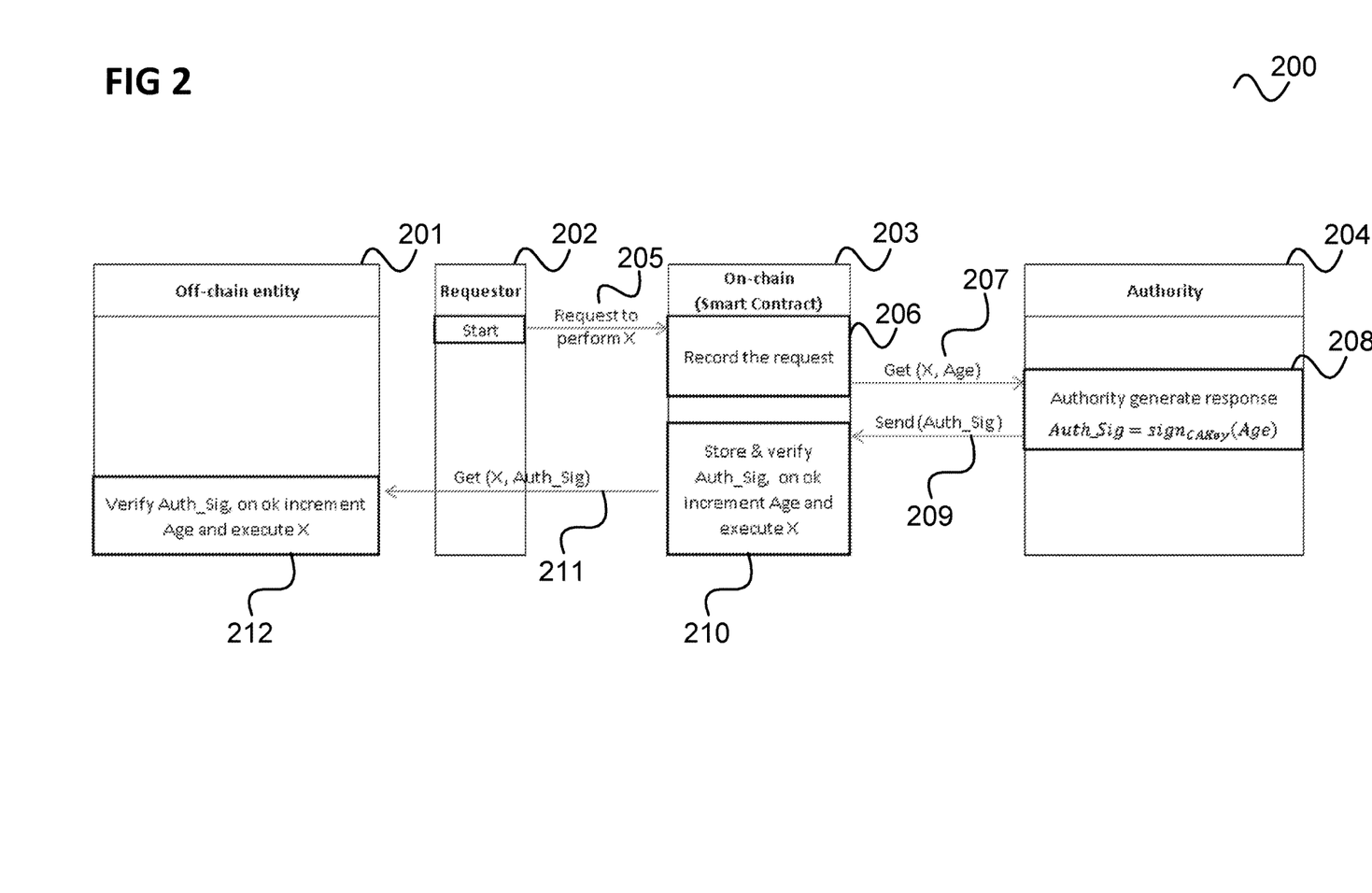
FIG. 2 shows a message flow diagram illustrating a message flow for an on-chain to off-chain transaction initiated by a requestor according to an aspect of the present disclosure.

For an off-chain entity to communicate with a smart contract, there are two ways which may be interchangeably used (for example, in the examples of FIGS. 2 and 4 as described below, 205-206 can be replaced by 405-408 and vice versa):

The off-chain entity can generate a transaction request by its own and rely on a communication medium (translation layer) to relay the message to the smart contract. Since the transaction request is formed by off-chain entity itself, no additional signature is needed to confirm the transaction request originated from off-chain entity. According to one aspect, in the underlying technology of blockchain, a transaction request itself always contains a signature, and this signature is generated by the account (a key pair) used to form the transaction request. An example of this is illustrated in the example of FIG. 2 at 205-206.

Figure 4:
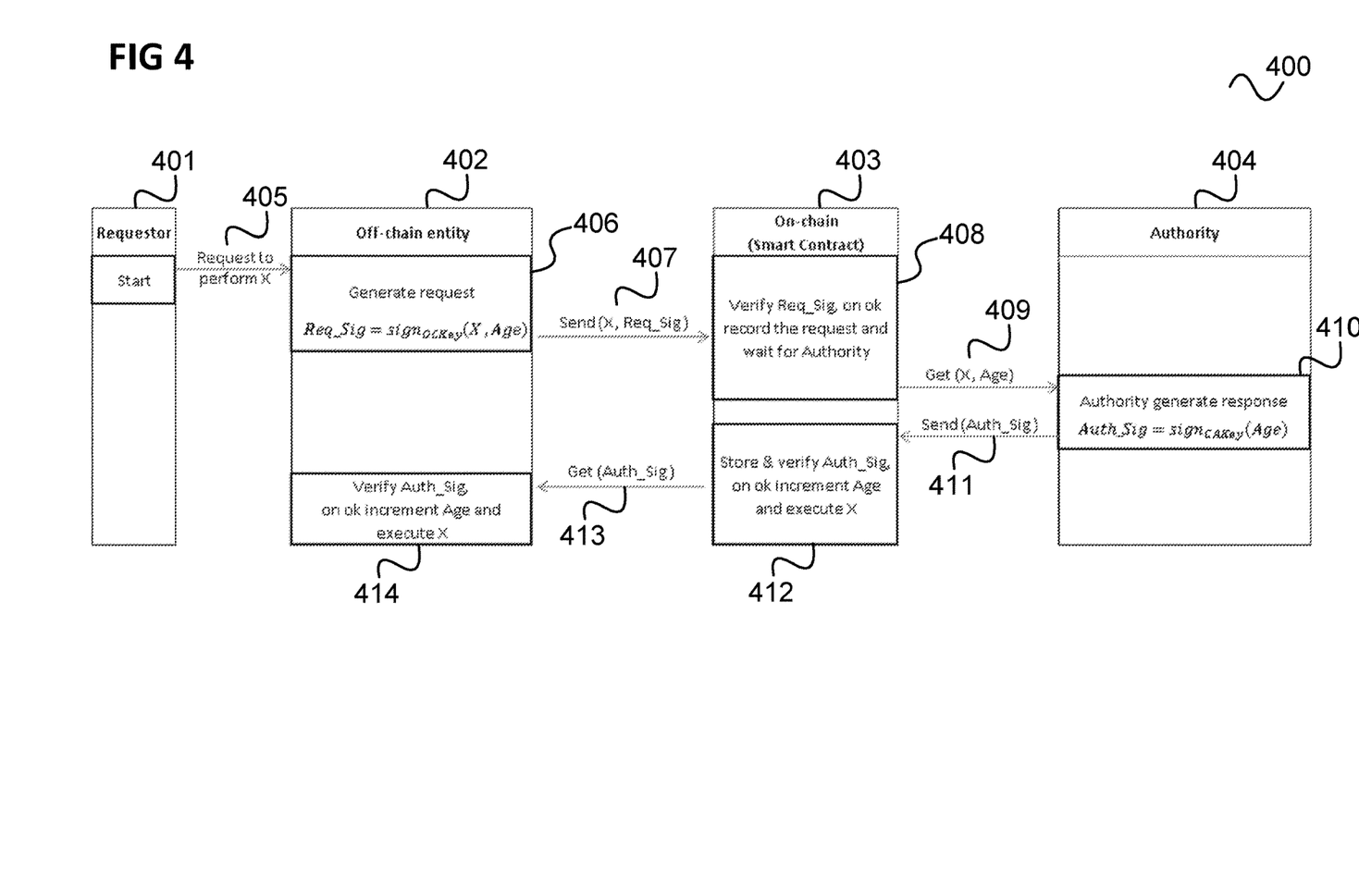
FIG. 4 shows a message flow diagram illustrating a message flow for an off-chain to on-chain transaction initiated by a requestor according to an aspect of the present disclosure.

A 3rd party blockchain account is used to form a transaction request on behalf of an off-chain entity. The transaction request is formed with parameters provided by the off-chain entity. In order to confirm the transaction request originated from the off-chain entity, a digital signature from off-chain entity is included. An example of this is illustrated in the example of FIG. 4 at 406-408.

Either way works without the need to have a trusted medium.

An off-chain entity may, for example, be a root of trust, e.g. a hardware root of trust, a microcontroller, a security controller, an embedded secure element, a contact-based or contactless smart card (of any form factor, e.g. including a smart card module for a wearable or a mobile phone), a computer, etc.

For performing an asset or instruction transfer between a blockchain distributed ledger, i.e. a blockchain provider computer arrangement 103, i.e. a blockchain entity, and an off-chain entity, a secure protocol is needed. It should be noted in this regard that blockchain transaction are typically not instant and do not function well without Internet connectivity (which an off-chain device may not permanently have) due to the typical blockchain design including consensus protocols.

In the following, approaches are described, which allow offline and instant transaction. They allow asset or instruction transfer from an on-chain entity (i.e., a blockchain entity) to an off-chain entity and vice versa. According to various aspects, the process of a transfer is supervised by an authority, e.g. a certification authority. According to various aspects, the authority, which may itself be an off-chain device, may then be able to transact according to a protocol (e.g., other than the blockchain protocol) allowing instant and offline transactions.

FIG. 2 shows a message flow diagram 200 illustrating a message flow for an on-chain to off-chain transaction initiated by a requestor according to an aspect of the present disclosure.

The message flow takes place between an off-chain entity (or off-chain device) 201, e.g. as described above corresponding to one of the user devices 101, a requestor 202, which may also correspond to one of the user devices 101 or also to one of the data processing computers 104, an on-chain entity 203 running a smart contract, e.g. corresponding to a blockchain provider computer of the blockchain provider computer arrangement 103, and a certification authority 204. The certification authority 204 may be a certification (computing) device and for example correspond to one of the data processing computers 104. It may, for example, be provided by a company offering a transaction service for the off-chain device 201. For example, the off-chain device 201 is a chip card allowing storage of an asset or monetary value (such as an amount of tokens) and a company offering the chip card also provides the certification authority device 204 for ensuring safety of transactions involving the monetary value between the chip card and blockchain entities.

In 205, the requestor 201 initiates a transfer of credit of amount X, i.e. a transfer of a monetary value, e.g. an amount of tokens, from the smart contract (i.e., from the on-chain entity 203) to the off-chain entity 201. For this, the requestor sends a data transfer request, also referred to as transaction request in this context, to the smart contract running on on-chain entity 203.

In 206, the smart contract records the request and freezes (i.e., locks) an amount as requested. The locking may also be implemented as a time-lock instead of a hard-lock: if a transaction request is in pending for a pre-defined amount of time, the amount will be unlocked. This is a mechanism to protect user assets. Further, at this stage, the smart contract may check if there are sufficient funds and/or whether the request is permitted and/or verify the identity of off-chain entity (e.g., by verifying the entity's public key, a unique ID, etc.). The smart contract may immediately reject the request if such as verification fails. Such a checking is optional and can be done by the smart contract or the certification authority 204.

In 207, the request is transmitted from the smart contract to the certification authority 204 by means of a Get message by the certification authority 204 including information about the request (e.g., one or more of the amount, the recipient, the source, etc.) and further a value of an age parameter. The age parameter is a counter value, e.g. a monotonic counter (which may be increased or decreased in certain steps), to prevent a replay attack, i.e. serves as a basis for an anti-replay mechanism. It may be increased with each operation of a certain type, e.g. each message exchange between the entities 201, 202, 203, 204.

In 208, the certification authority 204 checks the request, e.g. based on checking whether the off-chain entity 201 is included on a blacklist. For example, the off-chain entity 201 could be blacklisted for being known as a hacked device. It is assumed that the certification authority 204 approves the request (and equivalently, the transaction) in this example (e.g., since the off-chain entity 201 is not blacklisted). Therefore, the certification authority 204 signs the request (e.g., the information about the request) wherein it includes the value of the age parameter, i.e. it generates a digital signature based on the request and based on the age parameter.

In 209, the certification authority 204 provides the digital signature to the on-chain entity 203 by means of a Send message.

In 210, the smart contract of on-chain entity 203 checks whether the digital signature is valid. Further, the smart contract may use the age parameter here to detect a replay attack. If it detects a replay attack, it rejects the digital signature and the transaction. A checking of the age parameter may happen every time a signature is being verified to prevent a signature replay attack.

If the digital signature is valid (and no replay attack has been detected) the on-chain entity 203 increases the value of the age parameter (e.g., by one) and deducts the frozen amount from the smart contract. It should be noted that there may be two age parameters with synchronized value, one stored in the smart contract, the other stored in the off-chain entity. Further, it should be noted that if the credit is a value in terms of tokens, deducting the amount of tokens may mean that the tokens are destroyed. By way of contrast, cryptocurrencies are typically not destroyed.

In 211, the digital signature is transmitted from the smart contract to the off-chain device 201, e.g. by means of a Get message by the off-chain device 201.

In 212, the off-chain device 201 retrieves the digital signature from the smart contract. If the digital signature is valid, it increases the value of the age parameter and increases the credit (stored by itself) by the amount X. For example, the off-chain entity 201 is a smart card and a top-up of the smart card in terms of the credit X, e.g. by a certain amount of cryptocurrency or tokens is performed.

The digital signature may, for example, be formed over an identification of the request (or transaction). The various messages exchanged in the message flow of FIG. 2 may also include an indication of the request or the requested transaction, e.g. including an identification of the recipient, the source, the amount, etc.

Figure 3:
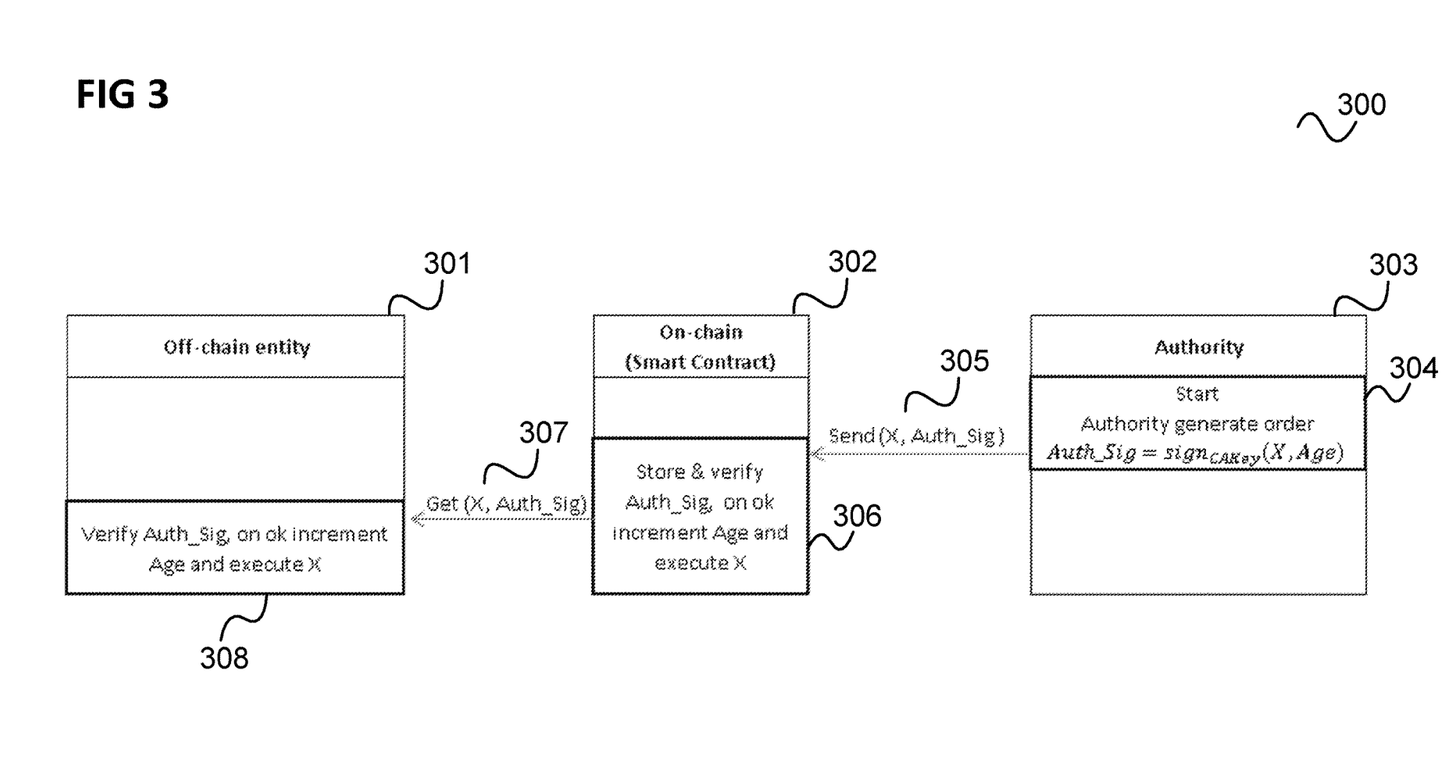
FIG. 3 shows a message flow diagram illustrating a message flow for an on-chain to off-chain transaction initiated by an authority according to an aspect of the present disclosure.

FIG. 3 shows a message flow diagram 300 illustrating a message flow for an on-chain to off-chain transaction initiated by an authority according to an aspect of the present disclosure.

The message flow takes place between an off-chain entity 301, an on-chain entity 302 and a certification authority 303 as described with reference to FIGS. 1 and 2. Features and examples described in context with the example of FIG. 2 may be analogously applied to the example of FIG. 3.

In 304, the certification authority 303 initiates a transfer of credit (according to a certain monetary value, e.g., tokens) from a smart contract running on the on-chain entity 302 to the off-chain entity. For this, the certification authority 303 signs a corresponding transfer request, including an indication of the sum X to be transferred with its secret key to create a digital signature. The digital signature may also be based on the value of an age parameter as described with reference to FIG. 2.

In 305, the certification authority 303 sends an indication of the request (or the requested transaction) to the on-chain entity 302 together with the digital signature, e.g. by means of a send message.

In 306, the smart contract of on-chain entity 302 checks whether the digital signature is valid. If it is valid the on-chain entity 302 increases the value of the age parameter (e.g., by one) and deducts the indicated amount X from the smart contract.

In 307, the digital signature is transmitted from the smart contract to the off-chain device 301, e.g. by means of a Get message by the off-chain device 301.

In 308, the off-chain device 301 retrieves the digital signature from the smart contract. If the digital signature is valid, it increases the value of the age parameter and increases its credit by the amount X.

FIG. 4 shows a message flow diagram 400 illustrating a message flow for an off-chain to on-chain transaction initiated by a requestor according to an aspect of the present disclosure.

The message flow takes place between a requestor 401, an off-chain entity 402, an on-chain entity 403 and a certification authority 404 as described with reference to FIGS. 1 and 2. Features and examples described in context with the examples of FIGS. 2 and 3 may be analogously applied to the example of FIG. 4.

In 405, the requestor 401 initiates a transfer of an amount X from the off-chain entity 402 to a smart contract running on the on-chain entity 403 by sending the request to the off-chain entity 402. The requestor 401 may, for example, be the off-chain entity 402 itself.

In 406, the off-chain entity 402 signs an indication of the request with its secret key and freezes (locks) the amount X of its credit, possibly under the condition that there are sufficient funds.

In 407, the off-chain entity 402 sends the digital signature and an indication of the request to the smart contract, e.g. by means of a Send message.

In 408, the smart contract may optionally check whether the digital signature is valid. If it is not valid, the smart contract rejects the request. Other than verifying the signature of the request, the smart contract may choose to verify the identity of the off-chain entity (e.g., by verifying its public key or unique ID, etc.). It can immediately reject the request if the verification fails. The checking is optional here and can be performed by the smart contract or the certification authority 404.

If it the digital signature is valid (or if the smart contract does not perform a check of the digital signature of the request), in 409, an indication of the request is transmitted from the smart contract to the authority, e.g. by means of a Get message by the certification authority 404 and the smart contract waits for approval from the certification authority 404. The message sent by the smart contract may include a value of an age parameter as described in context of FIG. 2. The message may also include the digital signature of the transaction request if a signature verification is performed by the certification authority 404 (e.g., as part of 410). It may also include information to check the identity of off-chain entity 402.

In 410, the certification authority 404 receives the indication of the request and the value of the age parameter from the smart contract. It checks the request and, for example, if the off-chain entity 402 is not blacklisted, as explained with reference to FIG. 2, approves the request by signing it with its secret key to generate a digital signature, which may also be based on the value of the age parameter, and sends the digital signature in 411 to the on-chain entity 403.

In 412, the smart contract of on-chain entity 403 checks whether the digital signature is valid. If it is valid the on-chain entity 403 increases the value of the age parameter (e.g., by one) and increases the credit (by the amount X) on the smart contract.

In 413, the digital signature is transmitted from the smart contract to the off-chain device 402, e.g. by means of a Get message by the off-chain device 402.

In 414, the off-chain device 402 retrieves the digital signature from the smart contract. If the digital signature is valid, it increases the value of the age parameter and decreases its credit by the locked amount X. The off-chain device 402 can also generate a receipt information, e.g. based on the digital signature, for example to later prove that the amount X has been paid.

In the examples of FIGS. 2 to 4, X may specify an amount of a monetary value or credit (e.g., in terms of an asset such as token, cryptocurrency or any other value) to be transferred from the smart contract to the off chain entity, and vice versa. For this, in the above examples, X is interchangeably used for specifying the requested amount to be transferred and the requested transfer.

However, X may also more generally stand for a cooperation between the on-chain entity and the off-chain entity and may not only correspond to a transaction or transfer of a certain monetary value, but may also be an include the request for the execution of an instruction to change a state or data of the smart contract and/or of the off-chain entity.

The various digital signatures may be generated based on a public key infrastructure (PKI) scheme. In the above examples, the authority and (FIG. 4 only) the off-chain entity use a function sign, which is a cryptographic process to generate a digital signature.

The authority generates its signature based on its private key CAKey of which it is the owner and the off-chain entity generates its signature based on its private key OCKey of which it is the owner. These keys are digital keys derived from asymmetric cryptography.

The public key of the authority is made known to the off-chain entity and/or the on-chain entity for signature verification purposes. Similarly, in the example of FIG. 4, the public key of the off-chain entity is made known to the on-chain entity for signature verification purposes.

The off-chain entity is, for example, a digital device that has computation power, storage space, and the capability to perform cryptographic operations (e.g., a microcontroller, security controller, embedded secure element, contact/contactless card, computer, etc.).

The off-chain entity may, for example, be connected to the on-chain entity by means of a communication device, such as a mobile telephone. For example, the off-chain entity is a smartcard inserted into a mobile telephone, which communicates with the on-chain entity by NFC (near field communication). For example, the on-chain entity is connected to or includes an NFC reader by means of which it communicates with the smart-card via the mobile telephone.

As mentioned above, instead of a transaction of an amount representing a monetary value (including any kind of tokens), a cooperation requested between the on-chain entity and the off-chain entity may include an instruction, i.e. a control operation, from one to the other. For example, the off-chain entity is a smart door, i.e. a remotely controllable door, or any other remotely controllable device of a smart home. In this case, when the on-chain entity sends the verified request (i.e., the digital signature) to the off-chain device, the off-chain device verifies the request, i.e. checks whether the digital signature is valid. The request may, for example, be the instruction to open a door (or generally a lock).

In case the off-chain device successfully verifies the request (i.e., verifies that the digital signature is valid), it executes the instruction. For example, if it is a smart door, it opens the lock of the smart door. In such an example, the on-chain entity is, for example, connected to the off-chain device by means of a gateway (e.g., by means of an Internet connection). The gateway may, for example, communicate with the off-chain device via a wireless (e.g., WiFi) connection.

In summary, according to various aspects, a blockchain entity (e.g., blockchain device, e.g. blockchain provider computer), an off-chain entity (e.g., off-chain device), a certification device for blockchain operations and a method for performing a cooperation between a blockchain entity and an off-chain entity according to FIGS. 5 to 8 are provided.

Figure 5:
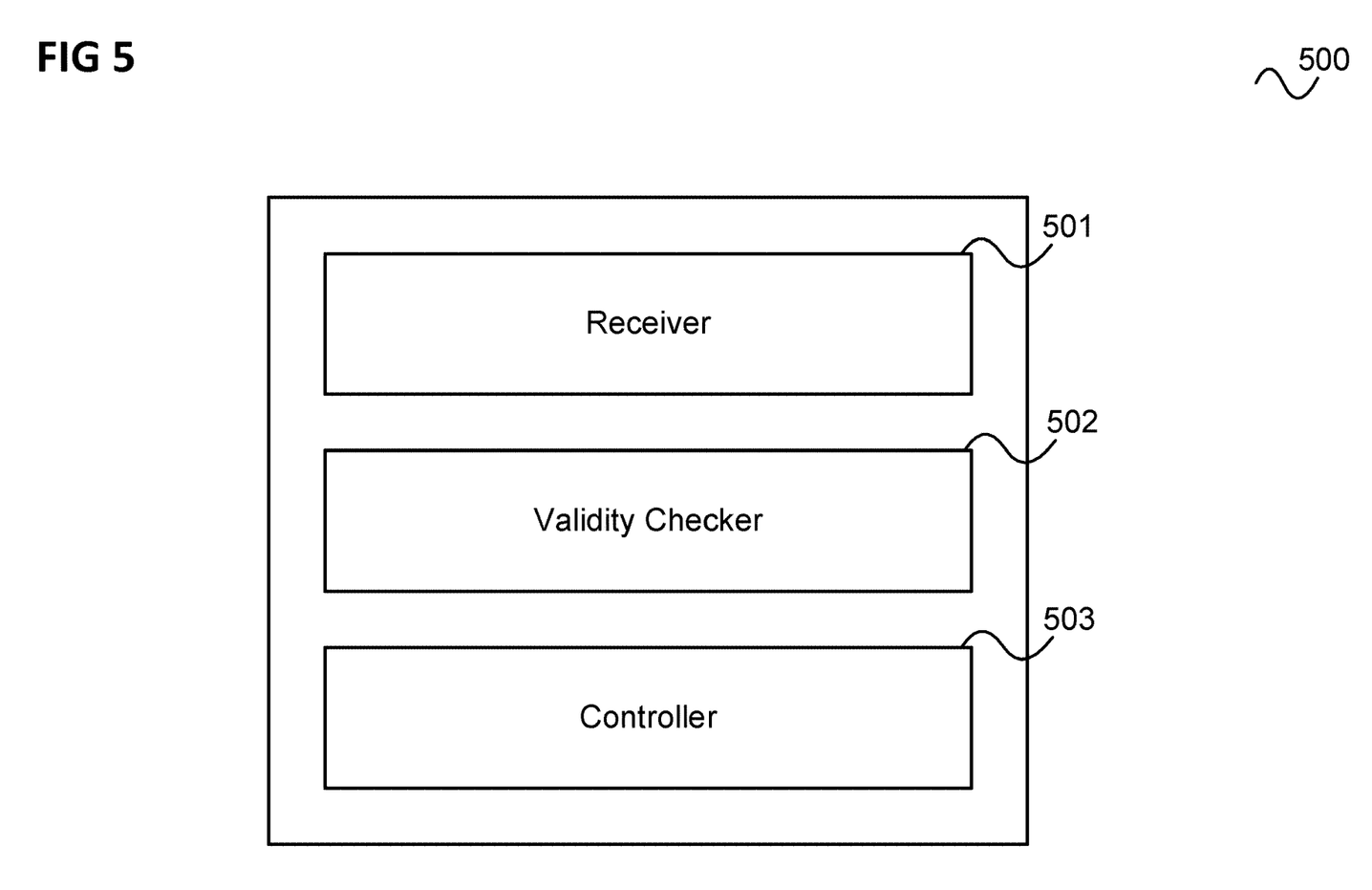
FIG. 5 shows a blockchain entity according to an aspect of the present disclosure.

FIG. 5 shows a blockchain entity 500 according to an aspect of the present disclosure.

The blockchain entity 500 includes a receiver (e.g., as a part of a transceiver) 501 configured to receive a digital signature of a certification entity for a cooperation between the blockchain entity and an off-chain device.

The blockchain entity 500 further includes a validity checker 502 configured to check whether the digital signature for the cooperation is valid and a controller 503 configured to perform the cooperation with the off-chain device if the digital signature for the cooperation is valid.

Figure 6:
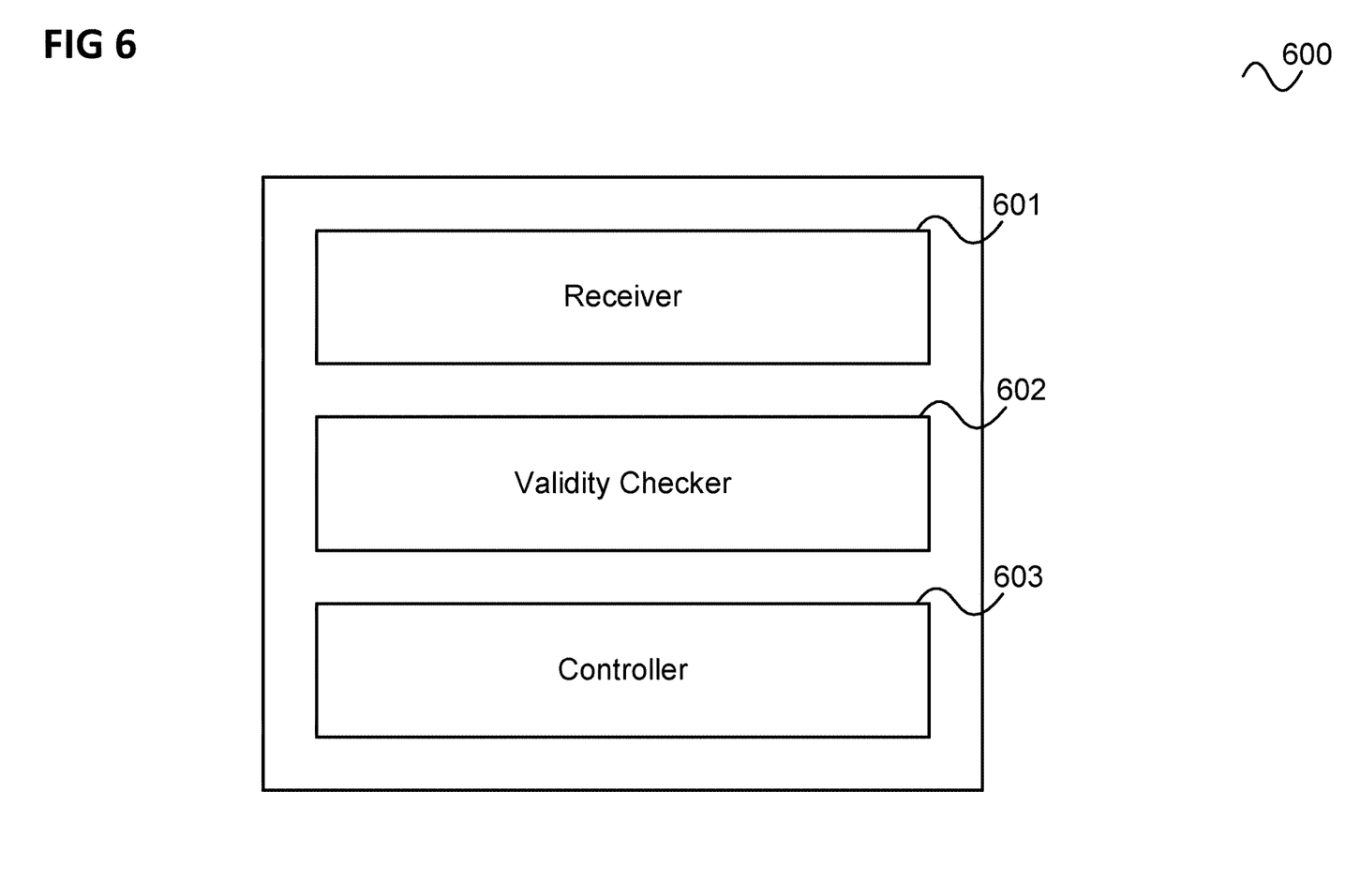
FIG. 6 shows an off-chain entity for interaction with a blockchain network according to an aspect of the present disclosure.

FIG. 6 shows an off-chain entity 600 for interaction with a blockchain network according to an aspect of the present disclosure.

The off-chain entity 600 includes a receiver 601 configured to receive a digital signature of a certification entity for a cooperation between a blockchain entity and the off-chain entity.

The off-chain entity 600 further includes a validity checker 602 configured to check whether the digital signature for the cooperation is valid.

Further, the off-chain entity 600 includes a controller 603 configured to perform the cooperation with the blockchain device if the digital signature for the cooperation is valid.

Figure 7:
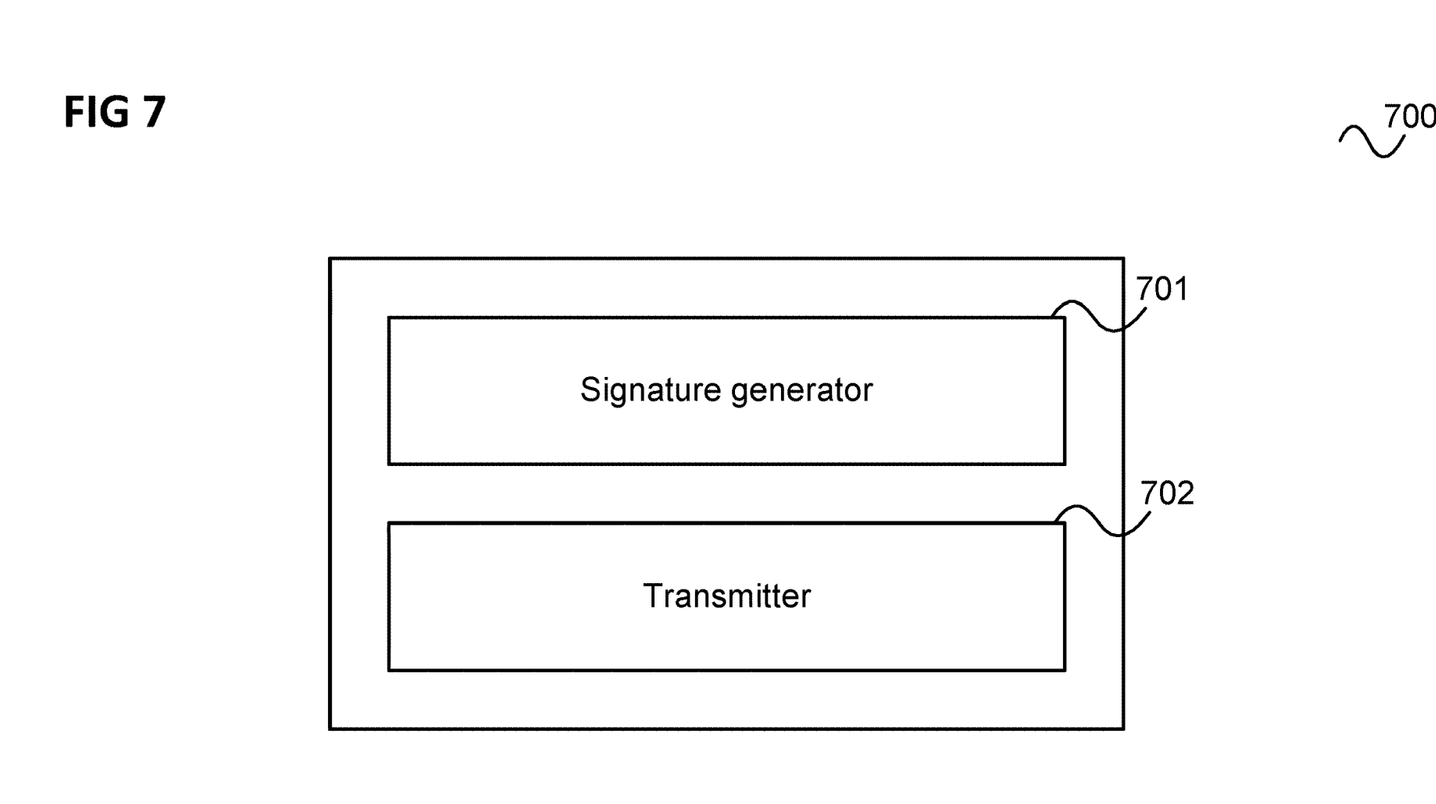
FIG. 7 shows a certification device for blockchain operations according to an aspect of the present disclosure.

FIG. 7 shows a certification device 700 (corresponding to the certification authority 303 and/or 404) for blockchain operations according to an aspect of the present disclosure.

The certification device 700 includes a signature generator 701 configured to generate a digital signature for a cooperation between a blockchain entity and an off-chain entity.

Further, the certification device 700 includes a transmitter 702 configured to transmit the digital signature to the blockchain entity.

Figure 8:
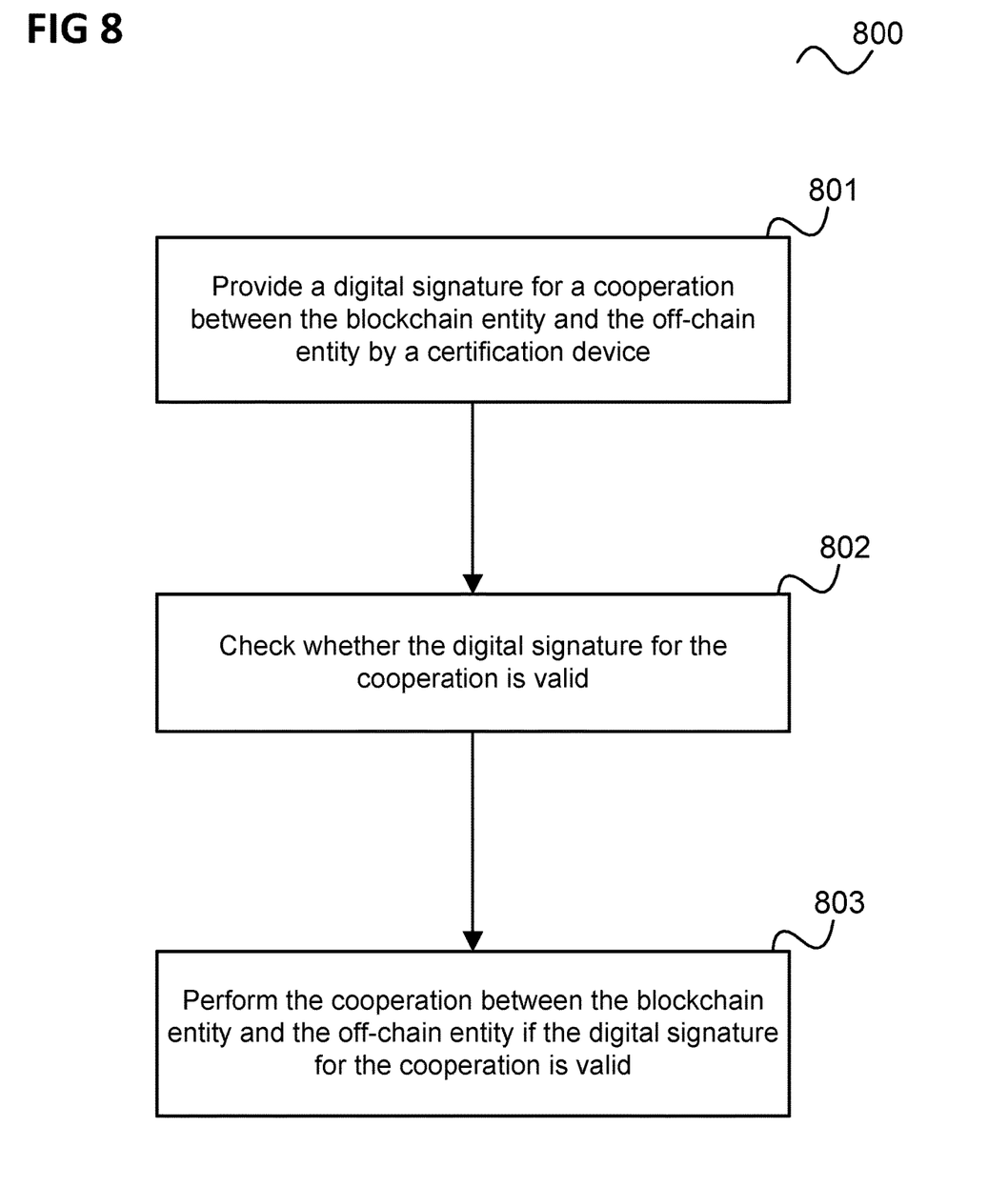
FIG. 8 shows a flow diagram illustrating a method for performing a cooperation between a blockchain entity and an off-chain entity.

FIG. 8 shows a flow diagram 800 illustrating a method for performing a cooperation between a blockchain entity and an off-chain entity.

In 801, a certification device provides a digital signature for a cooperation between the blockchain entity and the off-chain entity.

In 802, it is checked whether the digital signature for the cooperation is valid.

In 803, the cooperation between the blockchain entity and the off-chain entity is performed if the digital signature for the cooperation is valid.

According to various aspects, a request for a cooperation (such as a transaction) between an on-chain entity and an off-chain entity is checked and, if the check is positive, approved by means of a digital signature. The digital signature may be a cryptographic signature of information representing the cooperation, i.e. a signed version of information representing the cooperation. For example, in case of a transaction, the information representing the cooperation may include the transaction amount, the recipient of the amount and the source of the amount.

The approach corresponding to FIGS. 5 to 8 allows chip card security products (contactless cards, embedded secure elements, etc.) to enter the blockchain ecosystem. It may be applied to any system utilizing blockchain technology, such as a system for digital payment, transport & ticketing, a loyalty program and information sharing.

The blockchain entity, off-chain entity and certification device and their various components may each be implemented by one or more processors. A "processor" may be understood as any kind of a logic implementing entity, which may be special purpose circuitry or a processor executing software stored in a memory, firmware, or any combination thereof. Thus a "processor" may be a hardwired logic processor or a programmable logic processor such as a programmable processor, e.g. a microprocessor. A "processor" may also be a processor executing software, e.g. any kind of computer program. Any other kind of implementation of the respective functions, which will be described in more detail below, may also be understood as a "processor".

Various Examples are described in the following:

Example 1 is a blockchain entity as illustrated in FIG. 5.

Example 2 is the blockchain entity of Example 1, including a transmitter configured to transmit the digital signature to the off-chain device.

Example 3 is the blockchain entity of Example 1 or 2, wherein the cooperation is a transaction between the blockchain entity and the off-chain device.

Example 4 is the blockchain entity of any one of Examples 1 to 3, wherein the cooperation is a transfer of assets between the blockchain entity and the off-chain device.

Example 5 is the blockchain entity of any one of Examples 1 to 4, wherein the cooperation is a transfer of an amount of tokens from the blockchain entity to the off-chain device and the controller is configured to destroy, invalidate, freeze, lock or transfer ownership of the amount of tokens on the blockchain entity if the digital signature for the cooperation is valid.

Example 6 is the blockchain entity of any one of Examples 1 to 5, wherein the cooperation is a transfer of an amount of tokens from the blockchain entity to the off-chain device and the controller is configured to at least temporarily lock or freeze the amount of tokens on the blockchain entity in reaction to receiving a request for the cooperation.

Example 7 is the blockchain entity of any one of Examples 1 to 4, wherein the cooperation is a transfer of an amount of assets from the off-chain device to the blockchain entity and the controller is configured to increase a number of assets on the blockchain entity by the amount of assets if the digital signature for the cooperation is valid.

Example 8 is the blockchain entity of any one of Examples 1 to 7, wherein the cooperation is a change of state of at least one of the blockchain entity and the off-chain device.

Example 9 is the blockchain entity of any one of Examples 1 to 8, wherein the cooperation comprises an instruction from the blockchain entity to the off-chain device to change a state of the off-chain entity.

Example 10 is the blockchain entity of Example 9, wherein the instruction is an instruction to operate an actuator of the off-chain entity.

Example 11 is the blockchain entity of any one of Examples 1 to 10, including a transmitter configured to transmit a request for approval of the cooperation to the certification entity.

Example 12 is the blockchain entity of any one of Examples 1 to 11, wherein the receiver is configured to receive a request for the cooperation.

Example 13 is the blockchain entity of Example 12, wherein the receiver is configured to receive the request for the cooperation from the off-chain entity or from a user terminal.

Example 14 is the blockchain entity of Example 12, wherein the receiver is configured to receive the request for the cooperation from the off-chain entity and wherein the request for the cooperation includes a digital signature of the off-chain entity for the cooperation, the validity checker is further configured to check whether the digital signature of the off-chain entity for the cooperation is valid and the blockchain entity comprises a transmitter configured to transmit a request for approval of the cooperation to the certification entity if the digital signature of the off-chain entity for the cooperation is valid.

Example 15 is the blockchain entity of any one of Examples 1 to 14, wherein the digital signature is based on a counter value.

Example 16 is the blockchain entity of Example 15, wherein the counter value is based on time or a number of the cooperation.

Example 17 is the blockchain entity of Example 15 or 16, including a transmitter configured to transmit a request for approval of the cooperation to the certification entity.

Example 18 is the blockchain entity of Example 15 or 16, including a transmitter configured to transmit a request for approval of the cooperation to the certification entity wherein the request for approval includes the counter value.

Example 19 is the blockchain entity of any one of Examples 1 to 18, wherein the off-chain entity is a root of trust, a chipcard device, a microcontroller, a computer, a security controller, or an embedded secure element.

Example 20 is an off-chain entity for interaction with a blockchain network as illustrated in FIG. 6.

Example 21 is the off-chain entity of Example 20, wherein the cooperation is a transfer of an amount of tokens from the off-chain entity to the blockchain entity and the controller is configured to destroy, invalidate, freeze, lock or transfer ownership of the amount of tokens on the off-chain entity if the digital signature for the cooperation is valid.

Example 22 is the off-chain entity of Example 20 or 21, wherein the cooperation is a transfer of an amount of tokens from the blockchain entity to the off-chain entity and the controller is configured to increase a number of tokens on the off-chain entity by the amount of tokens if the digital signature for the cooperation is valid.

Example 23 is the off-chain entity of Example 20 or 21, wherein the cooperation is a transfer of an amount of tokens from the off-chain entity to the blockchain entity and the controller is configured to lock or freeze the amount of tokens on the off-chain entity in reaction to receiving a request for the cooperation.

Example 24 is the off-chain entity of any one of Examples 20 to 23, including a transmitter configured to transmit a request for the cooperation to the blockchain entity.

Example 25 is the off-chain entity of any one of Examples 20 to 24, wherein the receiver is configured to receive a request for the cooperation.

Example 26 is a certification device for blockchain operations as illustrated in FIG. 7.

Example 27 is the certification device of Example 26, including a receiver configured to receive a request for signing the cooperation including a digital signature for the cooperation by the off-chain entity and a validity checker configured to check whether the digital signature for the cooperation by the off-chain entity is valid, wherein the signature generator is configured to generate the digital signature if the digital signature for the cooperation by the off-chain entity is valid.

Example 28 is a method for performing a cooperation between a blockchain entity and an off-chain entity as illustrated in FIG. 8.

Example 29 is the method of Example 28, including transmitting the digital signature to the off-chain device.

Example 30 is the method of Example 28 or 29, wherein the cooperation is a transaction between the blockchain entity and the off-chain device.

Example 31 is the method of any one of Examples 28 to 30, wherein the cooperation is a transfer of assets between the blockchain entity and the off-chain device.

Example 32 is the method of any one of Examples 28 to 31, wherein the cooperation is a transfer of an amount of tokens from the blockchain entity to the off-chain device and the method comprises destroying, invalidating, freezing, locking or transferring ownership of the amount of tokens on the blockchain entity if the digital signature for the cooperation is valid.

Example 33 is the method of any one of Examples 28 to 32, wherein the cooperation is a transfer of an amount of tokens from the blockchain entity to the off-chain device and the method comprises at least temporarily locking or freezing the amount of tokens on the blockchain entity in reaction to receiving a request for the cooperation.

Example 34 is the method of any one of Examples 28 to 31, wherein the cooperation is a transfer of an amount of assets from the off-chain device to the blockchain entity and the method comprises increasing a number of assets on the blockchain entity by the amount of assets if the digital signature for the cooperation is valid.

Example 35 is the method of any one of Examples 28 to 34, wherein the cooperation is a change of state of at least one of the blockchain entity and the off-chain device.

Example 36 is the method of any one of Examples 28 to 35, wherein the cooperation comprises an instruction from the blockchain entity to the off-chain device to change a state of the off-chain entity.

Example 37 is the method of Example 36, wherein the instruction is an instruction to operate an actuator of the off-chain entity.

Example 38 is the method of any one of Examples 28 to 37, including transmitting a request for approval of the cooperation to the certification entity.

Example 39 is the method of any one of Examples 28 to 38, including receiving a request for the cooperation.

Example 40 is the method of Example 39, including receiving the request for the cooperation from the off-chain entity or from a user terminal.

Example 41 is the method of Example 39, including receiving the request for the cooperation from the off-chain entity, wherein the request for the cooperation includes a digital signature of the off-chain entity for the cooperation and wherein the method further comprises checking whether the digital signature of the off-chain entity for the cooperation is valid and transmitting a request for approval of the cooperation to the certification entity if the digital signature of the off-chain entity for the cooperation is valid.

Example 42 is the method of any one of Examples 28 to 41, wherein the digital signature is based on a counter value.

Example 43 is the method of Example 42, wherein the counter value is based on time or a number of the cooperation.

Example 44 is the method of Example 42 or 43, including transmitting a request for approval of the cooperation to the certification entity.

Example 45 is the method of Example 42 or 43, including transmitting a request for approval of the cooperation to the certification entity wherein the request for approval includes the counter value.

Example 46 is the method of any one of Examples 28 to 45, wherein the off-chain entity is a root of trust, a chipcard device, a microcontroller, a computer, a security controller, or an embedded secure element.

According to an example, a blockchain entity is provided including a receiving means for receiving a digital signature of a certification entity for a cooperation between the blockchain entity and an off-chain device, a validity checking means for checking whether the digital signature for the cooperation is valid and a controlling means for performing the cooperation with the off-chain device if the digital signature for the cooperation is valid.

According to a further example, an off-chain entity for interaction with a blockchain network is provided including a receiving means for receiving a digital signature of a certification entity for a cooperation between a blockchain entity and the off-chain entity, a validity checker for checking whether the digital signature for the cooperation is valid and a controlling means for performing the cooperation with the blockchain device if the digital signature for the cooperation is valid.

According to a further example, a certification device for blockchain operations is provided including a signature generating means for generating a digital signature for a cooperation between a blockchain entity and an off-chain entity and a transmitting means for transmitting the digital signature to the blockchain entity.

It should be noted that a feature of any one of the above examples may be combined with the features of any other example.

Although specific aspects of the present disclosure have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein. Therefore, it is intended that the present disclosure be limited only by the claims and the equivalents thereof.

REFERENCE SIGNS 100 blockchain network
101 user devices
102 communication network
104 data processing computers
200 message flow diagram
201 off-chain entity
202 requestor
203 on-chain entity
204 certification authority
205-212 processing steps
300 message flow diagram
301 off-chain entity
302 on-chain entity
303 certification authority
304-308 processing steps
400 message flow diagram
401 requestor
402 off-chain entity
403 on-chain entity
404 certification authority
405-414 processing steps
500 blockchain entity
501 receiver
502 validity checker
503 controller
600 off-chain entity
601 receiver
602 validity checker
603 controller
700 certification device
701 signature generator
702 transmitter
800 flow diagram
801-803 processing steps

The invention claimed is:

1. A blockchain entity comprising:
a receiver configured to receive a digital signature of a certification entity for a cooperation between the blockchain entity and an off-chain device, wherein the off-chain device is a device that has no direct access to a blockchain network of the blockchain entity;
a validity checker configured to check whether the digital signature for the cooperation is valid; and
a controller configured to perform the cooperation with the off-chain device if the digital signature for the cooperation is valid.

2. The blockchain entity of claim 1, further comprising:
a transmitter configured to transmit the digital signature to the off-chain device.

3. The blockchain entity of claim 1,
wherein the cooperation is:
a transaction between the blockchain entity and the off-chain device;
a transfer of assets between the blockchain entity and the off-chain device; or
a change of state of at least one of the blockchain entity or the off-chain device.

4. The blockchain entity of claim 1,
wherein the cooperation is a transfer of an amount of tokens from the blockchain entity to the off-chain device, and
wherein the controller is configured to destroy, invalidate, freeze, or lock the amount of tokens on the blockchain entity if the digital signature for the cooperation is valid.

5. The blockchain entity of claim 1,
wherein the cooperation is a transfer of an amount of tokens from the blockchain entity to the off-chain device, and
wherein the controller is configured to at least temporarily lock or freeze the amount of tokens on the blockchain entity in reaction to receiving a request for the cooperation.

6. The blockchain entity of claim 1,
wherein the cooperation is a transfer of an amount of assets from the off-chain device to the blockchain entity, and
wherein the controller is configured to increase a number of assets on the blockchain entity by the amount of assets if the digital signature for the cooperation is valid.

7. The blockchain entity of claim 1,
wherein the cooperation comprises an instruction from the blockchain entity to the off-chain device to change a state of the off-chain entity, and
wherein the instruction is an instruction to operate an actuator of the off-chain entity.

8. The blockchain entity of claim 1, further comprising:
a transmitter configured to transmit a request for approval of the cooperation to the certification entity.

9. The blockchain entity of claim 1,
wherein the receiver is configured to receive a request for the cooperation.

10. The blockchain entity of claim 9,
wherein the receiver is configured to receive the request for the cooperation from the off-chain entity,
wherein the request for the cooperation includes a digital signature of the off-chain entity for the cooperation,
wherein the validity checker is further configured to check whether the digital signature of the off-chain entity for the cooperation is valid, and
wherein the blockchain entity further comprises
a transmitter configured to transmit a request for approval of the cooperation to the certification entity if the digital signature of the off-chain entity for the cooperation is valid.

11. The blockchain entity of claim 1, further comprising:
a transmitter configured to transmit a request for approval of the cooperation to the certification entity,
wherein the validity checker checking whether the digital signature for the cooperation is valid comprises the validity checker receiving an authorization of the digital signature of the off-chain entity from the certification entity; and
wherein the certification entity is not able to obtain a latest version of a blockchain of the blockchain network.

12. The blockchain entity of claim 11,
wherein the request for approval includes a counter value.

13. An off-chain entity for interaction with a blockchain network, the off-chain entity comprising:
a receiver configured to receive a digital signature of a certification entity for a cooperation between a blockchain entity and the off-chain entity;
a validity checker configured to check whether the digital signature for the cooperation is valid; and
a controller configured to perform the cooperation with the blockchain device if the digital signature for the cooperation is valid;
wherein the off-chain entity is a device that has no direct access to a blockchain network of the blockchain entity.

14. The off-chain entity of claim 13,
wherein the cooperation is a transfer of an amount of tokens from the off-chain entity to the blockchain entity, and
wherein the controller is configured to destroy, invalidate, freeze, lock or transfer ownership of the amount of tokens on the off-chain entity if the digital signature for the cooperation is valid.

15. The off-chain entity of claim 13,
wherein the cooperation is a transfer of an amount of tokens from the blockchain entity to the off-chain entity, and
wherein the controller is configured to increase a number of tokens on the off-chain entity by the amount of tokens if the digital signature for the cooperation is valid.

16. The off-chain entity of claim 13,
wherein the cooperation is a transfer of an amount of tokens from the off-chain entity to the blockchain entity, and
wherein the controller is configured to lock or freeze the amount of tokens on the off-chain entity in response to receiving a request for the cooperation.

17. The off-chain entity of claim 13, further comprising:
a transmitter configured to transmit a request for the cooperation to the blockchain entity.

18. The off-chain entity of claim 13,
wherein the receiver is configured to receive a request for the cooperation.

19. A certification device for blockchain operations, the certification device comprising:
a signature generator configured to generate a digital signature for a cooperation between a blockchain entity and an off-chain entity; and
a transmitter configured to transmit the digital signature to the blockchain entity; and
wherein the certification entity is not able to obtain a latest version of a blockchain of the blockchain network.

20. The certification device of claim 19, further comprising:
- a receiver configured to receive a request for signing the cooperation including a digital signature for the cooperation by the off-chain entity; and
- a validity checker configured to check whether the digital signature for the cooperation by the off-chain entity is valid,
- wherein the signature generator is configured to generate the digital signature if the digital signature for the cooperation by the off-chain entity is valid.

21. A method for performing a cooperation between a blockchain entity and an off-chain entity, the method comprising:
- providing a digital signature for a cooperation between the blockchain entity and the off-chain entity;
- checking whether the digital signature for the cooperation is valid; and
- performing the cooperation between the blockchain entity and the off-chain entity if the digital signature for the cooperation is valid;
- wherein the off-chain device is a device that has no direct access to a blockchain network of the blockchain entity.

* * * * *